Nov. 21, 1939.   J. N. AKEN   2,181,084
ELECTRICAL CABLE
Filed July 10, 1936
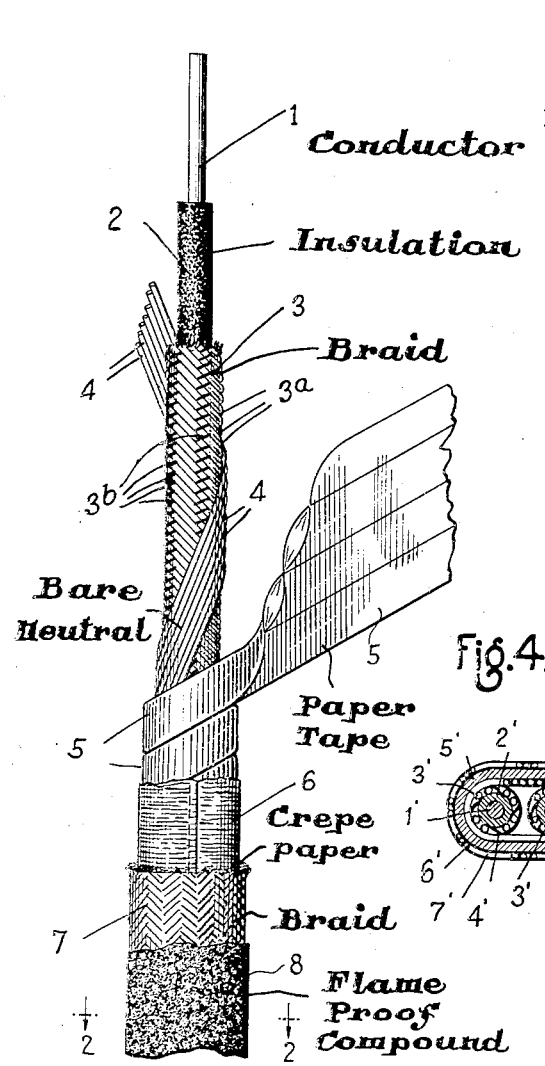
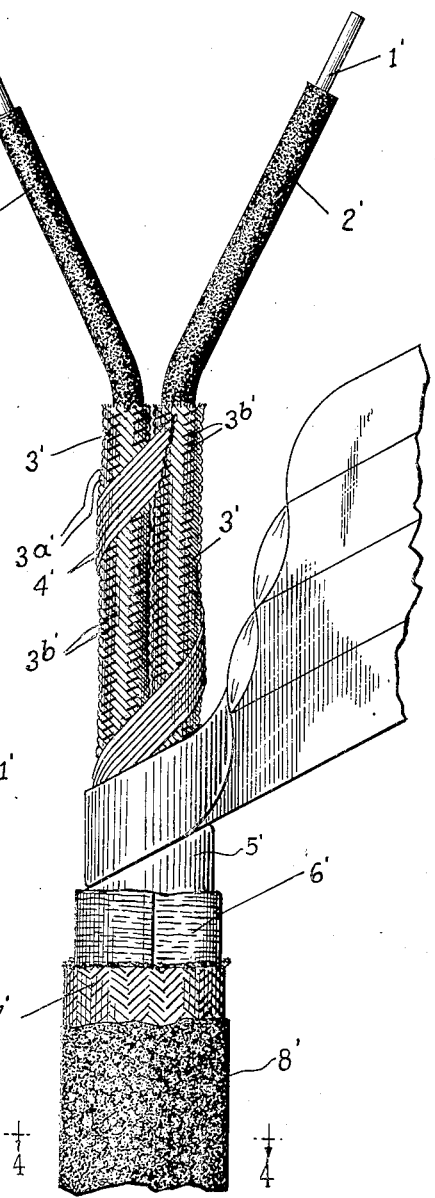
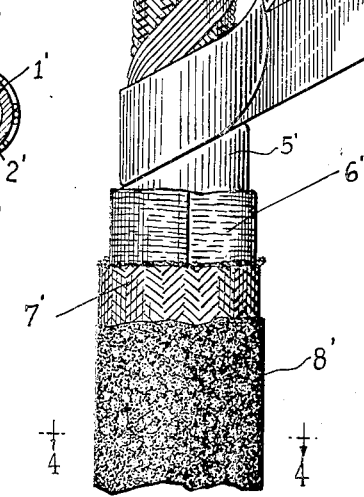
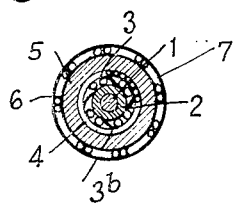
INVENTOR
J. N. AKEN
BY
George J. Schottler
ATTORNEY.

Patented Nov. 21, 1939

2,181,084

UNITED STATES PATENT OFFICE 2,181,084

ELECTRICAL CABLE

James Nelson Aken, Rome, N. Y., assignor to General Cable Corporation, New York, N. Y., a corporation of New Jersey Application July 10, 1936, Serial No. 89,908

4 Claims. (Cl. 174—115)

This invention relates to electrical cables and has for an object the provision of improvements in this art.

More particularly the invention relates to electrical cables intended primarily for the wiring of buildings which comprise one or more insulated conductors and a bare conductor, all of which conductors are adapted to be connected in an electrical circuit and to carry electrical current. The bare conductor, composed of one or a plurality of metal strands or wires, may be referred to as the bare neutral, and is separated from the insulated conductor or conductors by a layer or sheath of tough flexible fibrous non-metallic material, and the assembly is enclosed by another layer or sheath of tough flexible fibrous non-metallic material and an outer cover of fibrous material preferably treated to render it flame and moisture resistant.

Among the detailed or more particular objects of the invention are the provision of a non-metallic sheathed cable which will have good flexibility; which will have good electrical insulating characteristics as between the separate conductors thereof and adequate insulating and protective characteristics as between such conductors and any external conductor with which the cable may contact; which will have pronounced longitudinal strength to enable it to be subjected to heavy pulling stresses; which will have good resistance to mechanical penetration; which will have good resistance to external mechanical abrasion; which will have a relatively slick exterior finish so that it may be pulled past obstructions without binding; which will be resistant to flame and moisture; which may be readily stripped at the ends for making connections but without ravelling beyond the desired point of strippage; which may be relatively easily and inexpensively manufactured; and which will have other desirable characteristics which will be apparent from the following description of a specific embodiment considered with reference to the accompanying drawing thereof, wherein:

Fig. 1 is a longitudinal side view of one form of construction embodying the invention in a two-conductor cable, the outer elements being progressively removed to show the interior construction;

Fig. 2 is a section taken on the line 2—2 of Fig. 1;

Fig. 3 is a view similar to Fig. 1 showing the invention embodied in a three-conductor cable; and Fig. 4 is a section taken on the line 4—4 of Fig. 3.

The legends applied to the drawing are by way of illustration and not limitations.

Referring to the drawing, particularly Figs. 1 and 2, the two-conductor cable comprises a conductor 1 provided with an insulating covering 2 of rubber or other suitable material which is encased in a protective sheath 3 of non-metallic material, preferably in the form of a heavy braid. This sheath is applied in such a manner as to substantially completely cover the insulated conductor, but at the same time so as to be relatively flexible, and may be saturated and/or coated with a suitable compound or compounds to render it highly resistant to flame or moisture, or both.

One suitable form of sheath may be constructed by tightly braiding relatively coarse stiff strands 3a such as twisted paper, cotton or other fibrous material, with relatively light flexible strands 3b of a binding material such as cotton threads. The heavy strands can thus be laid in substantially edge-to-edge contact, the smaller strands 3b bending in and out around the heavy strands and embedding themselves slightly therein without substantially separating them. The light strands 3b need not form a continuous layer but are sufficiently numerous to bind the coarse stiff strands in place. The light strands may be dyed to impart a color character to the conductor to permit it to be readily identified.

Desirably the protective sheath 3 is adhesively secured to the insulating covering 2, so that the sheath becomes an integral part of the conductor insulation. This end may be accomplished by applying a suitable adhesive over the insulating covering 2 before the sheath 3 is applied. For example, the adhesive may be a rubber cement containing a fairly high percentage of varnish gums, or a flexible adhesive of the "Bakelite" type.

The adhesive prevents separation of the insulating covering 2 and the protective sheath 3 when the cable is bent or twisted, and prevents fraying of the braid when the cable is cut or opened. The adhesive also prevents wicking or seepage of moisture along the cable between the insulation and the protective sheath at the junction boxes.

Over the sheath 3 there is laid, preferably in spiral disposition with long open turns, a bare neutral conductor 4 comprising one or more metallic strands, such for example as tinned copper wires. The spiral disposition produces maximum flexibility and provides some protection for the interior insulated conductor, especially when a plurality of strands are laid parallel as illustrated. The parallel stranded construction also provides a relatively thin layer for the desired current capacity and furnishes a relatively smooth exterior for the outer coverings to aid in securing a smooth exterior for the finished cable. Where the bare neutral is divided into a plurality of small strands these are preferably grouped together as illustrated so that an installer may readily pick all of them up when making connections. Where the protective sheath 3 comprises relatively light and heavy strands as illustrated, the bare neutral may extend either in the same or opposite spiral direction as the heavy strands.

The use of an adhesive between the insulation 2 and the protective braid 3 as described hereinabove will permit untwisting the bare neutral for a short distance so that it may be looped into a junction box for connection without cutting the bare neutral, and subsequently twisting back the loose portion without destruction of the protective sheath. Where this is to be done the bare neutral preferably extends in the same spiral direction as the coarser strands of the braid 3 so that untwisting the bare neutral will tend to loosen the coarser strands rather than to stretch and rupture them.

Over the neutral conductor there is placed a protective covering 5, preferably of dense, tough, fibrous, non-metallic material. In the illustrative embodiment this material is flat-folded, impregnated paper tape. In some cases a rubberized fibrous tape may be substituted. This tape is wound tightly in edge-to-edge or overlapping contact so as to provide substantially complete coverage, and may extend either in the same or the opposite spiral direction as the bare neutral. The spiral disposition of the wrap provides maximum flexibility and permits easy removability after the outer cover is stripped at the ends in making connections.

Over the sheath 5 there may be placed a relatively thin sealing layer 6, one suitable form of which is illustrated as a longitudinal wrapping of tough crepe paper. This layer yields without tearing when the cable is bent, and serves a purpose hereinafter described.

Finally there is applied an outer covering 7, one suitable form of which consists of a braid of fibrous non-metallic material such as cotton. This braid desirably is impregnated and/or coated with a suitable compound or compounds 8 to render it flameproof, or highly resistant to flame, and moistureproof, or highly resistant to moisture. If the sealing layer 6 is present it serves as a dam to prevent this impregnating material from penetrating to the interior of the cable and keeps the conductors and insulation clean and non-sticky. The impregnating material may be such as to leave a slick surface on the cable or a separate coating may be applied for this purpose. One suitable impregnating compound for rendering the cover flame and moisture resistant is stearin pitch. The stearin pitch coating desirably has an overlying non-sticky coating such as size which may be firmly bonded to the pitch by flake mica. The conductor may then be coated with paint or lacquer if desired.

The cable shown in Figs. 3 and 4 is similar in construction to that shown in Figs. 1 and 2 except that it comprises a plurality of insulated and sheathed conductors instead of one. The same reference characters used on Figs. 1 and 2 are used with a prime (') to refer to similar parts on Figs. 3 and 4. In the plural-conductor cable each insulated conductor is preferably given a different color characteristic by using different colors of small strands 3b in the sheath 3.

While specific embodiments of the invention have been described for purposes of illustration it is to be understood that the invention may have various embodiments within the limits of the prior art and the scope of the subjoined claims.

I claim:

1. An electrical cable for use in wiring of buildings, comprising in combination, an insulated conductor, a flexible non-conductive protective sheath enclosing said insulated conductor formed of a plurality of closely placed relatively heavy spiral strands of tough dense fibrous material braided with a plurality of relatively light spiral strands of flexible fibrous material, a bare neutral stranded conductor of ribbonlike form spirally wrapped with a long lay directly over said sheath, a substantially continuous non-conductive covering of fibrous material overlying and directly contacting said bare neutral conductor, a relatively thin flexible sealing layer of fibrous material over said continuous non-conductive covering, and an outer flame and moisture resistant fabric braid.

2. An electrical cable for use in wiring of buildings, comprising in combination, an insulated conductor, a flexible non-conductive protective sheath enclosing said insulated conductor formed of a plurality of closely placed relatively heavy spiral strands of tough dense fibrous material braided with a plurality of relatively light spiral strands of flexible fibrous material, a bare neutral stranded conductor of ribbon-like form spirally wrapped with a long lay directly over said sheath, a substantially continuous non-conductive covering formed of a spirally wound, relatively thick, flat-folded tape of tough dense fibrous material overlying and directly contacting said bare neutral conductor, a relatively thin flexible sealing layer of fibrous material over said continuous non-conductive covering, and an outer flame and moisture resistant fabric braid.

3. An electrical cable for use in wiring of buildings, comprising in combination, an insulated conductor, a flexible non-conductive protective braided sheath adhesively united to and enclosing said insulated conductor and comprised of relatively heavy fibrous strands, a bare neutral conductor composed of a plurality of relatively small strands grouped together in ribbon-like form to facilitate the making of connections and spirally wrapped with a long lay directly over said sheath, a substantially continuous non-conductive covering of fibrous material overlying and directly contacting said bare neutral conductor, a relatively thin flexible sealing layer of fibrous material over said continuous non-conductive covering, and an outer flame and moisture resistant fabric braid.

4. An electrical cable for use in wiring of buildings, comprising in combination, an insulated conductor, a flexible non-conductive protective braided sheath adhesively united to and enclosing said insulated conductor and comprised of relatively heavy fibrous strands, a bare neutral conductor composed of a plurality of relatively small strands grouped together in ribbon-like form to facilitate the making of connections and spirally wrapped with a long lay directly over said sheath, a substantially continuous non-conductive covering of fibrous material overlying and directly contacting said bare neutral conductor, a relatively thin flexible sealing layer of longitudinally wrapped tough crepe paper over said continuous non-conductive covering, and an outer flame and moisture resistant fabric braid.

JAMES NELSON AKEN.